Sept. 13, 1960  R. L. PAGE  2,952,326
LOAD SHIFTING SUSPENSION FOR TANDEM AXLES
Filed Nov. 23, 1956  4 Sheets-Sheet 1

INVENTOR.
RAYMOND L. PAGE
BY

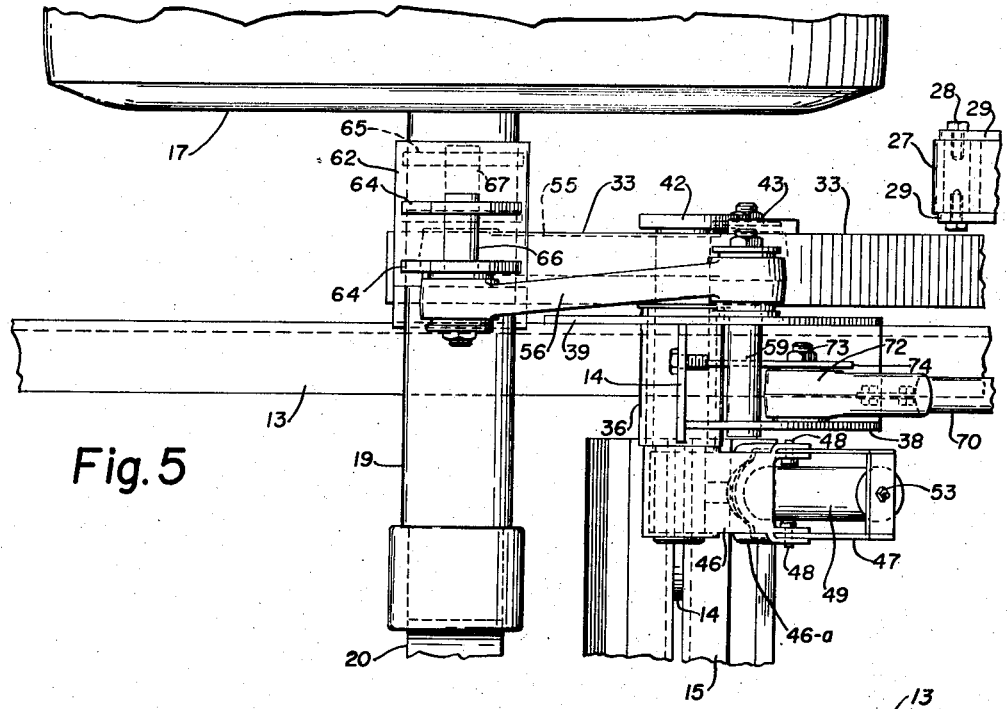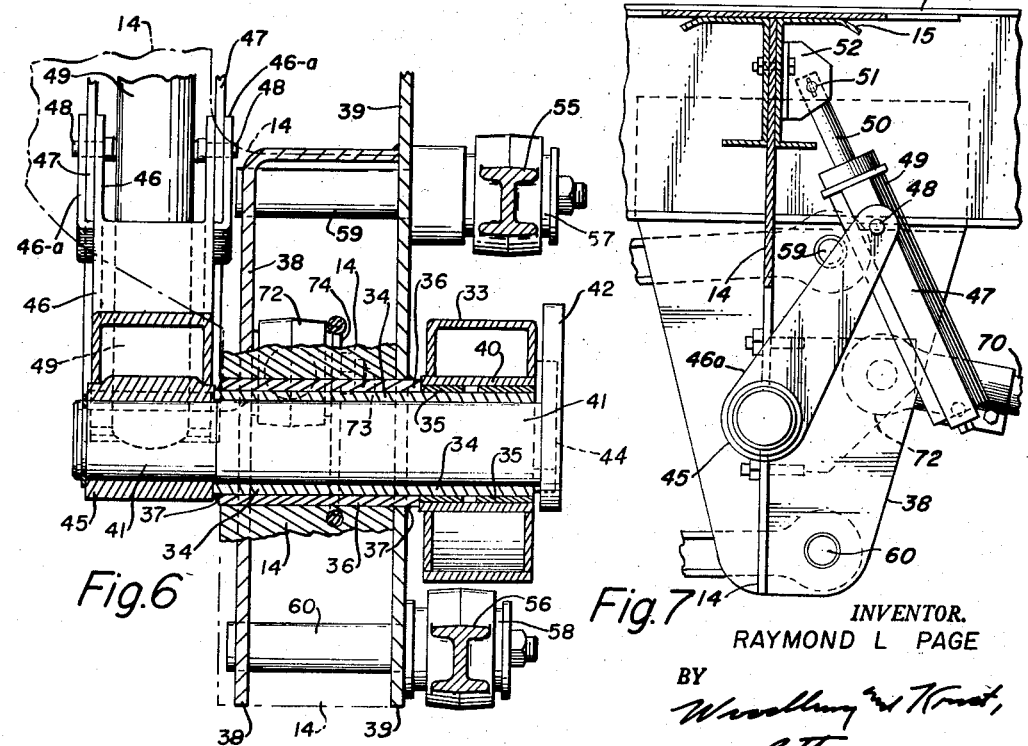

United States Patent Office 2,952,326
Patented Sept. 13, 1960

2,952,326
LOAD SHIFTING SUSPENSION FOR TANDEM AXLES

Raymond L. Page, Brecksville, Ohio, assignor to Truckstell Manufacturing Company, a corporation of Ohio Filed Nov. 23, 1956, Ser. No. 623,837

10 Claims. (Cl. 180—22)

My invention relates to the suspension system for axles of a vehicle, such as a truck, having a pair of rear axles arranged in tandem.

An object of my invention is to provide improved means for shifting the load from one rear axle to another rear axle of a pair of vehicle rear axles arranged in tandem.

Another object is the provision of improved means for raising one axle of a pair of tandem-arranged axles relative to the other axle of the pair.

Another object is the provision of improved apparatus arranged to vary the relationship of the load imposed by a vehicle between the rear axles of a pair of rear axles arranged in tandem along the vehicle frame.

Another object is the provision of a unique structure in a vehicle for accomplishing the foregoing objects.

Another object is the provision for dividing or spacing portions of a non-driven axle and apparatus carried thereby to accommodate a drive shaft leading to the driven axle.

Another object is the provision of a novel structure for obtaining unique and useful results in a new and improved manner.

Other objects and a fuller understanding of my invention may be had by referring to the following description and claims, taken in conjunction with the accompanying drawings, in which:

Figure 5 is a bottom view looking upward in the direction of the arrows 5—5 of Figure 3;

Figure 6 is a transverse view partially in section taken through the line 6—6 of Figure 3; and Figure 7 is a view looking in the direction of the arrows 7—7 of Figure 4.

Figure 1:
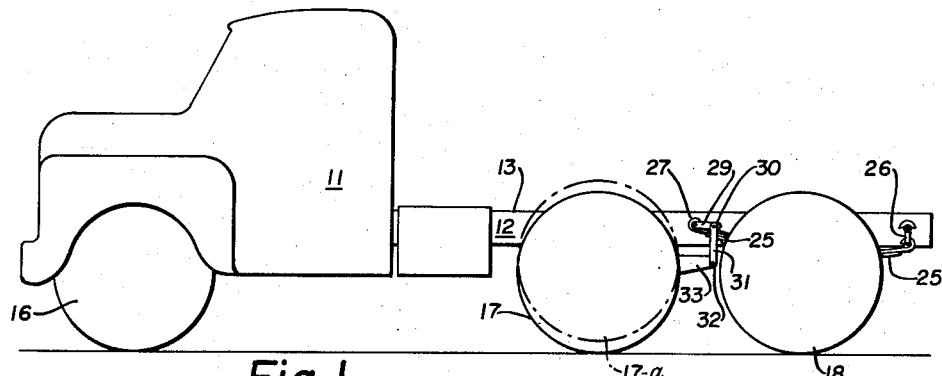
Figure 1 is a side view of a truck having rear axles arranged in tandem and embodying my invention.
Figure 2:
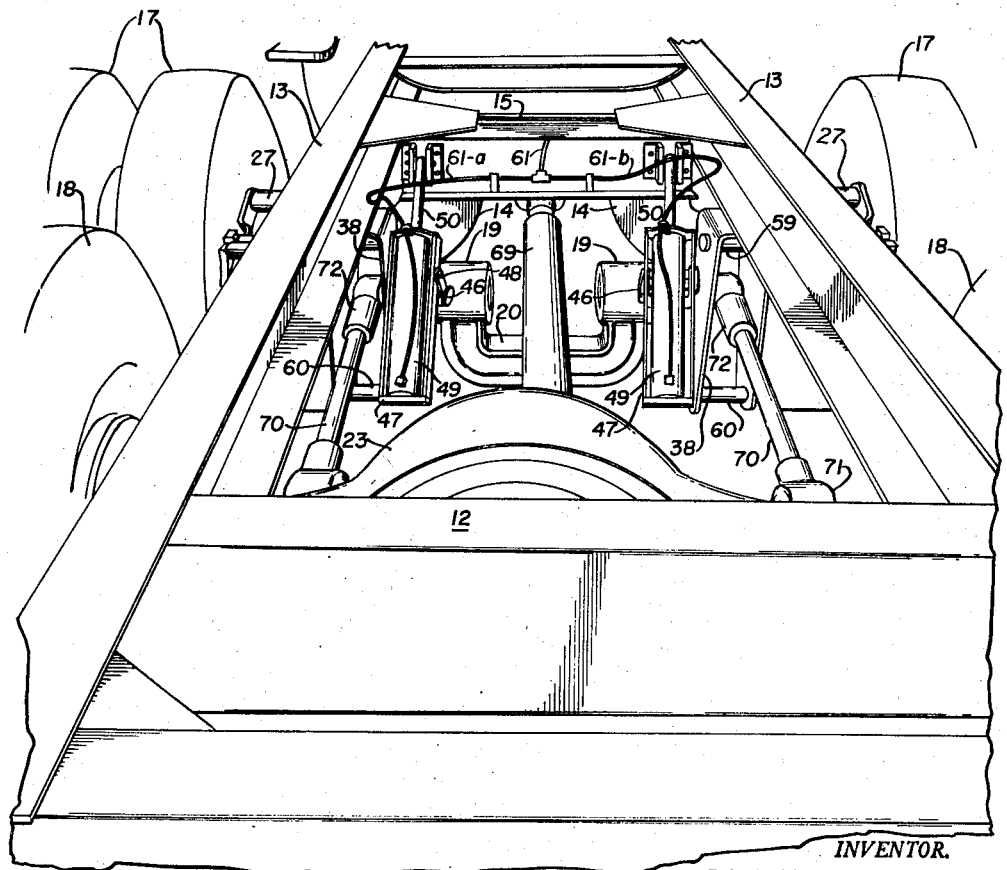
Figure 2 is a perspective view looking forwardly and downwardly from the rear of the truck.

Vehicles, such as trucks, to which my invention is applied are provided with two rear axles arranged in tandem, one of these axles being driven by the truck motor and the other of the axles being non-driven. In the illustration of my invention, the driven axle is shown as being the rearwardmost axle and the non-driven axle is shown as immediately preceding the driven axle under the frame of the truck.

In the drawings the truck or other vehicle is denoted generally by the reference character 11, which truck 11 has a frame indicated generally by the reference character 12. The frame 12 is made up of steel beams bolted or welded together in the usual manner. In the drawings, the frame 12 has two longitudinally extending side members 13. Between the side members 13 just rearwardly to the non-driven axle but forwardly of the driven axle, there is a transverse bracing piece 15. Extending downwardly from the opposite ends of the transverse piece 15 and adjacent the side members 13 are depending pieces 14, the depending pieces 14 having edges which extend downwardly and laterally outward as they extend from the transverse piece 15.

The front steering wheels of the vehicle, as shown in Figure 1, are denoted by the reference character 16. The rear wheels arranged in tandem are denoted by the reference characters 17 and 18. The wheels 17 are mounted upon the non-driven axle. The axle housing 19 of the non-driven axle has a U-shaped intermediate portion 20 located intermediate of the lateral sides of the vehicle, this intermediate portion 20 being displaced from the axis of the axle housing 19 to accommodate a drive shaft 69 which extends under the frame along its middle from the engine transmission to the rearward axle housing 23 of the driven axle. The wheels 17 are journaled to the outer ends of the axle housing 19 in the usual manner.

The rearward axle housing 23 carries a rearward axle 24 upon which are journaled the rearward wheels 18 in the usual manner. The rear driven-axle housing 23 is suspended from and mounted to the side members 13 of the frame 12 by a pair of leaf-spring structures 25. One leaf-spring structure 25 is mounted outwardly of and adjacent one side member 13 and the other leaf-spring structure 25 is mounted outwardly of and adjacent the other side member 13. The leaf-spring structures 25 arranged parallel to each other are made up of a plurality of leaf-spring members of decreasing length. The rear axle housing 23 is connected to the leaf-spring structures 25 intermediate the ends of the structures 25 in the usual manner so that the weight imposed upon the spring structure is transmitted to the rear driven axle. The rearward end of the leaf-spring structures 25 are connected by the shackles 26 to the frame side members 13 in the usual manner so that the weight on the frame is transmitted through the shackles 26 to the spring structures 25 and hence to the rearward driven axle.

The forward ends 27 of the spring structures 25 are not connected to the side members 13 of the frame but rather are connected by bolts 28, respectively, to shackle arms 29, each shackle arm 29 being in two parts pivotally connected by the bolts 28 to the forward end 27 of a spring structure 25.

A cross-bolt 30 connected to the rearward ends of the shackle arms 29 above the top of the spring structures 25 pivotally connects downwardly extending links 31 to the arms 29, which links 31 are in two parts so as to straddle the respective spring structures as they extend downwardly from the pivot bolts 30. The lower ends of the links 31 are pivotally connected by cross-bolts 32 to the rearward ends of levers or walking beams 33.

The levers or walking beams 33 extend longitudinally of the truck and are spaced from each other laterally of the truck. Each lever or beam 33 has a cylindrical sleeve 40 extending therethrough intermediate its ends and this sleeve 40 is carried upon a tubular pivot support 34 which has its axis disposed transversely of the truck, there being a tubular pivot support on each side of the truck for each of the levers or beams 33.

As shown more particularly in Figure 6, there are sleeve bearings 35, preferably of the bronze type, between the cylindrical sleeve 40 integrally welded to the lever 33 and the outer cylindrical surface of the tubular pivot support 34. In this manner, the levers or beams 33 are free to pivotally rock about the axis of the tubular supports 34, respectively.

To support the tubular supports 34 in position, there are two steel plates 39 each welded to a side member 13 and extending downwardly therefrom. Welded to each steel plate 39 is a steel bracket 38 which has a portion disposed parallel to and spaced from the plate 39. Each tubular pivot support 34 is disposed in a cylindrical support 36 extending through aligned openings in plates 39 and 38 and welded to the plates 39 and 38. Thus the tubular supports 34 are carried by the side members 13, respectively, through the plates 38 and 39 carried thereby. The weldments 37 secure the cylindrical support 36 to the plates 38 and 39.

There are a pair of rocking shafts 41 each journaled in a respective tubular pivot support 34 in such manner that each rocking shaft may rotate on its axis within the tubular support 34 surrounding the shaft. Thus, any weight or axial stress imposed upon the tubular pivot support 34 by the lever or beam 33 carried thereon is not transmitted to the shaft 41 within the tubular support and thus the shaft 41 may freely rock or rotate without the friction or resistance that would be encountered if the weight or stress of the lever or beam 33 were imparted directly to the shaft 41. In this manner, the shaft 41 may be freely rocked or rotated within its respective tubular support 34.

Keyed to the outer end of each rocking shaft 41 is an abutting member 42 so that upon rotation of the shaft 41 upon its axis, the abutting member 42 swings in an arc with shaft 41. A locking assembly 43 locks and keys the abutting member 42 to its respective shaft 41.

Figure 3:
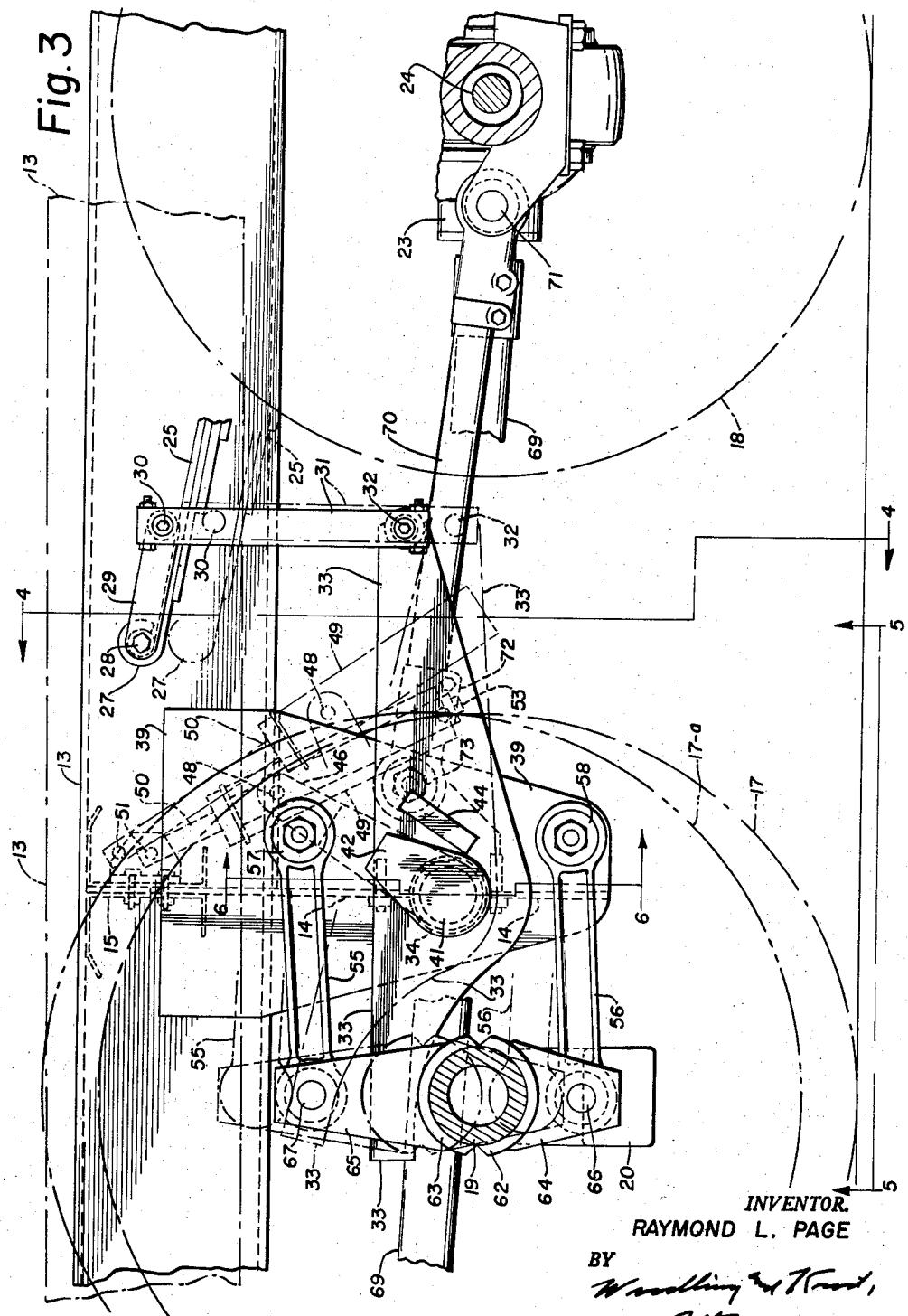
Figure 3 is an enlarged view partially in section through a vertical plane longitudinally of the truck and taken through line 3—3 of Figure 4.

Welded or otherwise securely fastened to each lever or beam 33 is a stop or limit 44. The angular disposition of the stops 44 on the two levers or beams 33 are the same. Each of the stops or limits 44 has a surface adapted to be engaged by the associated abutting member 42 extending along the respective lever or beam 33. This surface which is engageable by the abutting member 42 is disposed at an incline so that its lower end is closer to the axis of the shaft 41 than its upper end, as illustrated in Figure 3.

Means are provided to rock or rotate the shafts 41 by hydraulic means operatively connected to the inner ends of the shafts 41, that is, to their ends opposite the abutting members 42. A sleeve 45 is keyed to the inner end of the respective shafts 41 so that the sleeve 45 and shaft 41 rotate together. A bracket arm 46 is welded to each sleeve 45 so that the bracket arm 46 extends radially outward from the shaft 41. Swinging of the bracket arm 46 about the axis of the shaft 41 causes the shaft 41 to rotate and hence causes the abutting member 42 carried thereby to swing toward and away from the stops or limits 44 and thus to rock the respective levers or beams 33.

A U-shaped holder 47 is pivotally connected to the outer end of each bracket arm 46 by pivot bolts 48. The holder 47 is in the the form of a frame for holding and supporting a hydraulic cylinder 49. The outer end of each bracket arm 46 has a finger portion 46-a displaced therefrom and the sides of the holder 47 are interleaved with the arm 46 and its finger portion 46-a at its outer end. The pivot bolts 48 extend through the interleaved portions of the arm 46 and holder 47 and tightly abut against the sides of the hydraulic cylinder 49. An anchor bolt and nut assembly 53 secures the lower end of each cylinder 49 to its respective U-shaped holder 47. Thus, the respective hydraulic cylinders 49 are pivotally connected to the outer ends of the bracket arms 46 which are so secured to the respective shafts 41 as to cause rotation or rocking of the shafts 41 upon actuation of the cylinders 49.

Extending from the upper ends of the respective cylinders 49 are piston stems 50 and the ends of these stems 50 are pivotally connected by pins 51 to bracket 52 carried by the transverse piece 15. A conduit system, including a supply tube 61 and branch tubes 61-a and 61-b, supply fluid under pressure to the two cylinders 49 in such manner as to actuate the piston and cylinder assemblies. Suitable conduits and relief valves are provided to prevent overloading of the cylinders beyond predetermined amounts and thus to prevent breakage of the parts by unwanted actuation of the assemblies after they have reached desired positions. The tube 61 is supplied with fluid under pressure from a pump powered by the truck engine. As the tube 61 supplies fluid under pressure simultaneously to both cylinders through the branch tubes 61-a and 61-b, the fluid pressure to the two cylinders is equalized.

The position of the non-driven-axle housing 19 longitudinally of the frame is substantially maintained by a parallelogram structure which permits the non-driven-axle housing 19 to move up and down in a plane normal to the horizontal plane of the frame. Braking torque on the non-driven-axle housing 19 is resisted by the parallelogram structure utilized for mainataining the described position in this plane of the non-driven-axle housing.

Figure 4:
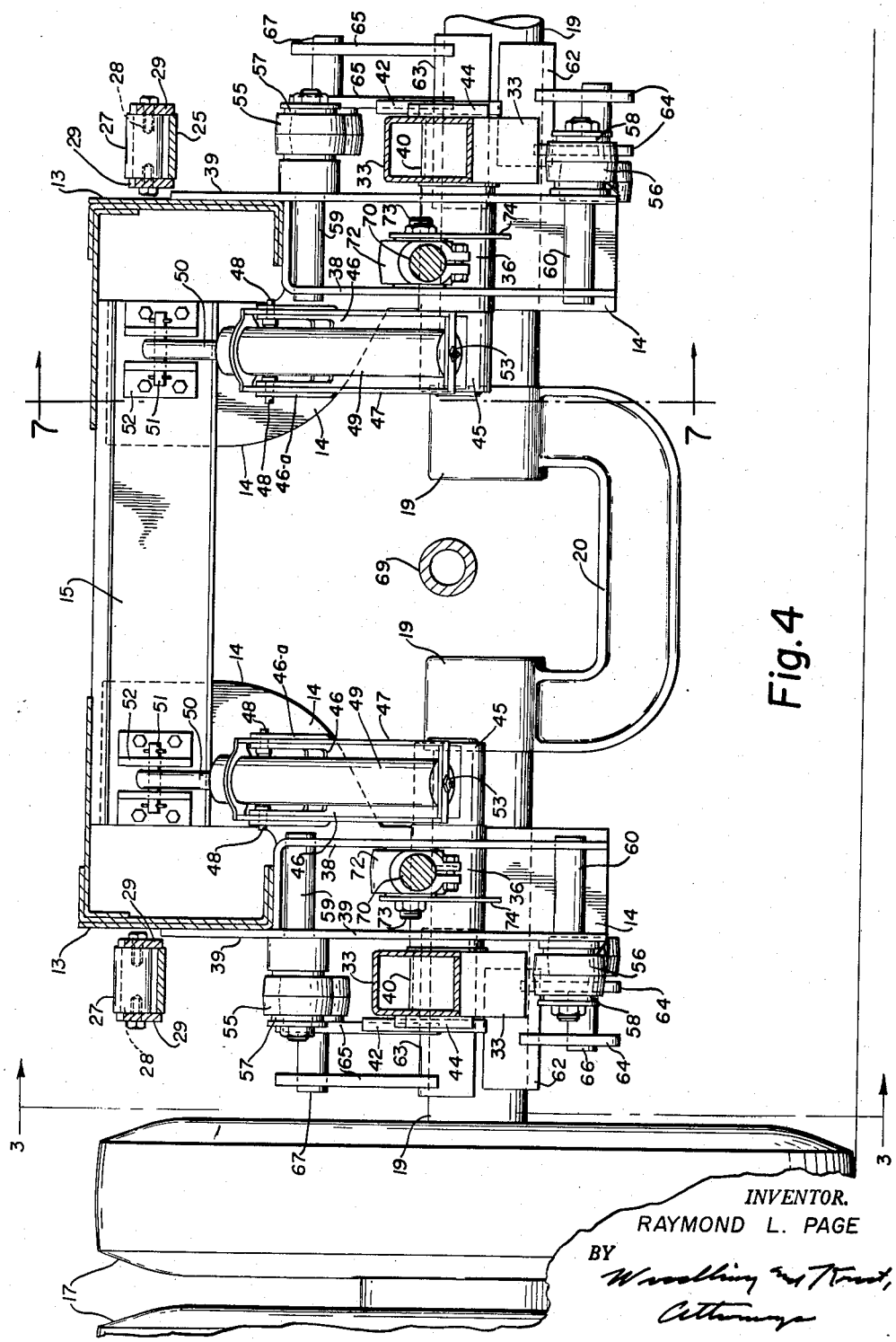
Figure 4 is a transverse sectional view of the truck embodying my invention and taken through the line 4—4 of Figure 3.

The parallelogram structure is made up of an upper torque rod 55 and a lower torque rod 56 arranged in pairs, each pair being on opposite lateral sides of the truck. Each pair of torque rods 55 and 56 is arranged parallel to the other pair, as viewed from the side of the truck; for example, as viewed in Figure 3. The upper torque rod 55 is pivotally carried by the plates 38 and 39 extending downwardly from a side member 13. Each lower torque rod 56 is pivotally carried by a pivot connection 58 on a stud support 60 also carried by the plates 38 and 39 supported by a side member 13. The stud support 60 is positioned below the stud support 59. The stud support 59 extends laterally outward from the plate 39 more than the stud support 60 so that the pivot connection 57 and the rearward end of the upper torque 55 are positioned laterally outward more than are the pivot connection 58 and the lower end of the torque rod 56. As seen in Figure 4, the rearward ends of the torque rods 55 and 56 are not in the same vertical plane, the rearward end of the upper torque rod 55 being displaced laterally outward of the vertical longitudinal plane extending through the rearward end of the lower torque rod 56.

The upper torque rods 55 of the pairs of torque rods on each side of the vehicle are arranged parallel to the side members 13 of the frame and also parallel to each other. However, the lower torque rods 56 of the pairs of torque rods 56 converge toward each other as they extend forwardly of the truck from the pivot connections 58. As seen in a plan view, the lower torque rods 56 are not parallel to each other and have their forward ends closer to each other than their rearward ends. This convergence of the lower torque rods 56 toward each other and toward the middle of the vehicle is shown in Figure 5, which is a bottom view looking upwardly upon one of the torque rods 56 on one side of the truck.

Inasmuch as the non-driven axle housing 19 is positioned in advance of the pivot connections 57 and 58 to which the rear ends of the torque rods 55 and 56 are pivotally connected, there would be a tendency of the non-driven axle housing 19 to veer to the right or left as the vehicle moves forwardly along the highway. In other words, the non-driven axle housing 19 with wheels 17 thereon instead of trailing the pivot connections 57 and 58 is pushed forwardly as the vehicle moves along the highway. The tendency of the wheels 17 to veer or move laterally as the truck moves forwardly is resisted by the steering action provided by the inward converging lower torque rods 56. The inward convergence of the lower torque rods 56 as they extend forwardly and inwardly toward each other tends to steer the non-driven axle housing 19 and thus to maintain the wheels 17 in proper alignment along the frame of the vehicle. As is known, a pair of wheels on a pushed axle tend to veer from side to side as they meet irregularities in the road surface. Unless restrained, the vehicle, once started toward one side, would continue further to that one side as the vehicle goes forward. This tendency is corrected by the restraint to sideward veering that is provided by the inwardly converging lower torque rods 56. In the case of wheels on a pulled axle, as distinct from a pushed axle, the tendency to veer from side to side through irregularities in the road surface is constantly restrained or corrected by the pulling of the axle and its wheels forwardly along the road.

A pair of semi-sleeves 62 and 63 are welded to the non-driven axle housing 19 adjacent its opposite ends. The lower semi-sleeve 62 is disposed under the axle housing and the upper semi-sleeve 63 extends over the axle housing. These sleeves 62 and 63 are welded or so secured to the housing 19 as to be rigidly connected thereto. There are a pair of lower plates 64 welded to the lower semi-sleeve 62 and spaced apart laterally of the vehicle. There are also a pair of spaced plates 65 welded to the upper semi-sleeve 63 and extending upwardly therefrom. A lower pivot bolt 66 is carried by the pair of plates 64 and the forward end of the lower torque rod 56 is pivotally connected to this pivot bolt 66. A pivot bolt 67 is carried by the plates 65 and the forward end of the upper torque rod 55 is pivotally connected to this pivot bolt 67. Thus, the forward ends of the torque rods 55 and 56 of each pair of torque rods are pivotally connected at spaced locations to the non-driven axle 19 to provide the parallelogram structure and functions that have been described.

A pair of radius rods 70 have their rearward ends pivotally connected by the pivot connections 71 to the rear axle housing 23. Mounted to the forward ends of the two radius rods 70, respectively, are apertured connecting portions 72. A bolt 73 extending through the apertured connecting portions 72 of the radius rods 70 pivotally connects the apertured connecting portions 72 to the plate 38 and a plate 74 spaced from the plate 38 and carried by the depending piece 14. By means of the radius rods 70, the position of the rear driven axle housing 23 is maintained longitudinally of the frame as the rear axle housing 23 changes its relative spacing toward and away from the frame by reason of the resilient connection and the leaf-spring structures 25 connecting the frame to the housing 23.

When the hydraulic cylinders 49 are at rest, that is, when fluid under pressure is not introduced into the cylinders, the levers or beams 33 at their forward ends engage the top surface of the non-driven axle housing 19 in the position illustrated in full lines in Figure 3. When in this condition, the load imparted to the non-driven axle 19 is transmitted thereto through the forward ends of the levers or beams 33. In this same condition or position of the parts, the rearward end of the levers or beams 33 are resiliently urged upwardly by the leaf-spring structures 25 by reason of the links 31 interconnecting the bolts 32 on the end of the levers or beams 33 and the bolts 30 which cross over and rest upon the forward free end of the leaf-spring structures 25. When the wheels 17 carried by the non-driven axle 19 hit a bump or raised portion in the road so as to push the non-driven axle upwardly toward the frame of the truck, this force is transmitted through the levers or beams 33 and links 31 so as to resiliently depress or urge downwardly the forward free ends of the respective leaf spring structures 25. It is to be recalled that the rearward end of the leaf-spring structures are coupled to the frame at the rear end thereof by the shackles 26, whereas the forward ends of the leaf-spring structures 25 are not directly connected to the frame but are free to move up and down relative to the frame. Upon the moving downwardly of the rear ends of the levers or beams 33, the forward free ends of the leaf-spring structures 25 are moved downwardly, such as for example, to the position shown in broken lines in Figure 3. Upon the wheels 17 passing beyond the bump or raised portion, they resume their former position on the level of the roadway to the position where the levers or beams 33 are in full lines in Figure 3 and the forward free ends of the springs 25 are in the position shown in full lines in Figure 3.

When in the "at rest" or non-working condition of the hydraulic piston and cylinder assemblies, the rocker shaft 41 and the abutting members 42 are in the relative position illustrated in full lines in Figure 3. In this position, the abutting members 42 are not engaging the stops or limits 44 so there is no forced rocking of the levers or beams 33 by the action of the hydraulic cylinder and piston assemblies. In this condition or position, the tubular pivot supports 34 act as fulcrums upon which the levers or beams 33 pivot.

Upon introduction of fluid under pressure to the cylinder by the operator manipulating the valve controlling admission of fluid to the fluid conduit 61 and branch conduits 61–a and 61–b, there is first such movement of the pistons in the cylinders 49 as to take up any slack or idle movement between the pistons and cylinders. When the fluid pressure in the cylinders 49 has reached the stage as to extend the cylinders 49 relative to the piston stems 50, the bracket arms 46 are revolved in an arc around the axis of the rocker shafts 41. As seen in Figure 3, this movement is in a clockwise direction and causes the abutting members 42 on the outer ends of the rocker shafts 41 to swing in an arc in a similar clockwise direction. This forced movement of the abutting members 42 toward the rear of the vehicle causes the abutting members 42 to engage and force downwardly the stops or limits 44 carried by the levers or beams 33. This downward forcing of the limits or stops 44 rocks or swings the levers or beams 33 in a direction to depress or lower the rearward end of the respective levers or beams 33. This downward movement of the rearward end of the levers or beams 33 resiliently depresses the forward free ends of the respective leaf-spring structures 25 and at the same time raises the forward ends of the levers or beams 33 upwardly away from the top surface of the non-driven axle 19. The depression of the forward free ends of the leaf-spring structures 25 tends to move the rearward wheels 18 and the rear axle housing 23 downwardly relative to the frame 13 by reason of the pivot connection between the rearward ends of the leaf-spring structures 25 and the frame. This downward force on the wheels 18 which engage the surface of the roadway in effect raises the frame so that the side members 13 move from the position shown in solid lines in Figure 3 to the position shown in broken lines in Figure 3. The load imparted by the weight on the frame is thus shifted rearwardly from the wheels 17 on the non-driven axle 19 to the wheels 18 on the driven axle 24 in the rear axle housing 23. Continued introduction of fluid under pressure into the cylinders 49 continues downward movement of the rearward ends of the levers or beams 33 and the upward movement of the forward ends of the levers or beams 33. It is to be noted that there is a free space above the non-driven axle 19 within which the forward end of the lever or beam 33 may move for a distance upwardly. After operation of the hydraulic piston assembly has continued during the interval that the forward ends of the levers or beams 33 have moved upwardly through this free distance, then the top surface of the forward ends of the levers or beams 33 engage the lower surface of the forward ends of the respective upper torque rods 55 where they are pivotally carried by the pivot bolts 67. As the bolts 67 are carried by the parallel plates 65, which in turn are welded to the semi-sleeve 63 on the non-driven axle housing 19, the continued upward movement of the forward ends of the levers or beams 33 engaging the forward ends of the torque rods 55 causes the raising of the non-driven axle 19 and the wheels 17 thereby upwardly from the road surface so that the wheels 17 no longer bear any of the weight of the truck. In this raised position, the wheels 17 are in that position shown in broken lines and indicated by the reference character 17–a in Figure 3. In this position, the forward ends of the levers or beams 33 are in the position shown in broken lines in Figure 3 and the torque rods 55 and 56 have swung in arcs on the pivot connections 57 and 58 to the raised position shown in broken lines in Figure 3. In this position of the wheels 17-a, the load formerly carried by wheels 17 and 18 has now been completely transmitted to the wheels 18. This additional load on the wheels 18 aids in obtaining better traction between the wheels 18 and the road surface, whereas when the load was distributed between wheels 17 and 18, there was not the same traction provided for the truck, such as required when driving up a slippery hill.

It is to be noted that the resilient support of the non-driven axle housing 19 is derived through the levers or beams 33 and links 31 from the leaf-spring structures 25 which also provide the spring suspension for the rear axle housing 23. It is also to be noted that upward and downward movement imparted to the non-driven axle housing 19 by unevenness in the road is imparted through the levers or beams 33, the links 31 and the leaf-spring structures 25 to the rear axle housing 23 so as to provide a compensatory movement. This compensatory movement provides that when the wheels 17 are suddenly moved upwardly by a bump, the wheels 18 are resiliently moved downwardly to maintain the level of the truck frame.

By having the levers or beams 33 carried by the tubular supports 34 rather than by directly upon the rocker shafts 41, it is provided that the rocker shafts 41 may freely rotate or rock within the tubular supports 34 without the rocker shafts 41 bearing the weight imparted to the tubular supports 34 by the levers or beams 33. Thus, an improved and freer operation of the parts is obtained and many of the disadvantages of prior constructions are eliminated.

When it is desired to again have the weight of the truck distributed between the wheels 17 and the wheels 18, then the valve controlling the flow of fluid to the cylinders 49 is manipulated by the operator so as to permit the pistons to move downwardly in the cylinders 49 and thus to provide for upward swinging of the bracket arms 46 and the rotation of rocker shafts 41 in a counter-clockwise direction, as viewed in Figure 3, and to thus move the abutting members 42 away from the limits or stops 44. In this resumed position of the parts, they are again in the position shown in full lines in Figure 3.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a vehicle having a frame and a pair of rear axles arranged in tandem, apparatus for changing the relative spacing between said frame and one of said rear axles, the combination of a pair of walking beams spaced laterally of the vehicle frame and extending substantially longitudinally of the frame, a pair of tubular members each carried by said frame adjacent a side thereof and extending substantially laterally of the frame, each said tubular member pivotally supporting a respective walking beam to permit rocking of a walking beam on the axis of a said tubular member, a pair of shafts each mounted in a said tubular member and rotatable therein, each of said shafts being independently rotatable relative to the other of said shafts, a pair of hydraulic ram assemblies each interconnected to said frame and a said shaft to rock the respective shaft on its axis upon operation of the associated ram assembly, conduit means providing communication between said assemblies and with a source of hydraulic pressure to provide equal hydraulic pressure to said ram assemblies, coupling means operatively interconnecting the respective walking beams to said one of the rear axles at a longitudinal distance from the axis of said tubular member, an abutting member extending radially from each said shaft adjacent a respective walking beam and rockable therewith upon rocking of the said shaft, each said walking beam having a stop portion engageable by a said projecting member upon rocking of the associated projecting member, said abutting members and said stop portions, respectively, being arranged to provide that the abutting members upon rocking in one direction engage the stop portions, respectively, to swing said walking beams on the axis of said tubular members and raise said one of the rear axles toward said frame.

2. In a vehicle having a frame and a pair of rear axles arranged in tandem, apparatus for changing the relative spacing between said frame and one axle of said pair of rear axles, the combination of a pair of walking beams arranged longitudinally of said frame and spaced laterally of the frame, a pair of spaced and axially aligned tubular pivot means carried by said frame and providing pivot support for said beams to permit the rocking of said beams on the axis of said tubular pivot means, a pair of spaced and axially aligned shaft means concentrically mounted in said tubular pivot means, each of said shaft means being independently rotatable relative to the other of said shaft means, operating means for rocking said shaft means on the axis of said shaft means, interengaging means carried by shaft means and said beams arranged to provide for rocking of said beams in one direction only upon rocking of said shaft means in a corresponding direction, said operating means including a pair of hydraulic piston and cylinder assemblies each operatively connected to a respective shaft means for independently rocking the respective shaft means, hydraulic supply means connecting both of said assemblies to a common source of hydraulic pressure and to each other to supply equal hydraulic pressure to said assemblies, and coupling means operatively connecting said beams to said one axle at a longitudinal distance from said axis to provide for raising said one axle relative to said frame upon rocking beyond a predetermined degree of said beams in said one direction.

3. In a vehicle having a frame, a pair of rear axles arranged in tandem and leaf-spring means operatively connecting said frame and said axles to provide for the spring suspension of said axles, the combination of a pair of levers arranged longitudinally of the frame and spaced laterally thereof, each of said levers having a first end portion arranged to raise a first of said axles toward said frame upon upward movement of said first end portions, each of said levers having an opposite end portion arranged to move a second of said axles away from said frame upon downward movement of said opposite end portions, pivot support means carried by said frame providing fulcrum support for said levers to permit rocking of said levers, a pair of spaced and axially aligned shaft means disposed laterally of said frame and rockable on the axis of the shaft means, each of said shaft means being independently rotatable relative to the other of said shaft means, said shaft means being free of the mass borne by said pivot support means to rock independently of said pivot support means, operating means for rocking said shaft means, said operating means including a pair of hydraulic piston and cylinder assemblies each operatively connected to a respective one of said shaft means to independently rotate the respective shaft means, hydraulic supply means providing communication between a common source of hydraulic pressure and the piston and cylinder assemblies and between the respective piston and cylinder assemblies to supply equal hydraulic pressure to the piston and cylinder assemblies, and interengaging means associated with said shaft means and the respective levers to provide for rocking of said levers in one direction upon the rocking of the shaft means in a corresponding direction by said operating means, means coupling said lever end portions and said first axle and leaf-spring means whereby the rocking of said levers in said one direction upwardly moves said first end portions to raise said first axle toward said frame and downwardly moves said opposite end portions to move the said second axle away from said frame.

4. In a vehicle having a frame, a pair of rear axles arranged in tandem and leaf-spring means operatively connecting said frame and said axles to provide for the spring suspension of the said axles, the combination of a pair of levers arranged longitudinally of the frame and spaced laterally thereof, each of said levers having a first end portion arranged to raise a first of said axles toward said frame upon upward movement of said first end portions, each of said levers having an opposite end portion arranged to move a second of said axles away from said frame upon downward movement of said opposite end portions, a pair of spaced and axially aligned pivot support means carried by said frame providing fulcrum support for said levers to permit rocking of said levers, a pair of spaced and axially aligned, shaft means disposed laterally of said frame and rockable on the axis of the shaft means, each of said shaft means being independently rockable relative to the other shaft means, said shaft means being free of the mass borne by said pivot support means to rock independently of said pivot support means, operating means for rocking said shaft means, said hydraulic means including a pair of independently operable hydraulic ram assemblies each operatively connected to one of said shaft means to independently rock the same, hydraulic conduit means providing communication between said ram assemblies and with a source of hydraulic pressure for providing hydraulic pressure from said source at equal pressures to said assemblies, interengaging means associated with said shaft means and the respective levers to provide for rocking of said levers in one direction upon the rocking of the shaft means in a corresponding direction by said operation means, means coupling said lever end portions and said first axle and leaf-spring means whereby the rocking of said levers in said one direction upwardly moves said first end portions to raise said first axle toward said frame and downwardly moves said opposite end portions to move the said second axle away from said frame, and pairs of spaced torque bars having first ends pivotally carried by said frame and second ends pivotally carried by said first axle to maintain the said first axle in a plane normal to said frame at varying spacing of said first axle relative to said frame.

5. In a vehicle having a frame, a pair of rear axles arranged in tandem and leaf-spring means operatively connecting said frame and said axles to provide for the spring suspension of the said axles, the combination of a pair of levers arranged longitudinally of the frame and spaced laterally thereof, each of said levers having a first end portion arranged to raise a first of said axles toward said frame upon upward movement of said first end portions, each of said levers having an opposite end portion arranged to move a second of said axles away from said frame upon downward movement of opposite end portions, a pair of spaced and axially aligned pivot supports carried by said frame providing fulcrum support for said levers to permit rocking of said levers, a pair of spaced and axially aligned shafts disposed laterally of said frame carried by the pivot supports and rockable independently of each other on the axis of the pivot supports, said shafts being free of the mass borne by said pivot supports to rock independently of said pivot supports, operating means for rocking said shafts, said operating means including a pair of hydraulic ram assemblies each operatively connected to a respective shaft independently to rock the same, and conduit means provided intercommunication between the ram assemblies and a source of hydraulic pressure to supply hydraulic pressure equally to said assemblies, interengaging means associated with said shafts and the respective levers to provide for rocking of said levers in one direction upon the rocking of the shafts in a corresponding direction by said operation means, the rocking of said levers in said one direction upwardly moving said first end portions to raise said first axle towards said frame and downwardly moving said opposite end portions to move the said second axle away from said frame, and pairs of spaced torque rods having first ends pivotally carried by said frame and second ends pivotally carried by said first axle to maintain the said first axle in a plane normal to said frame at varying spacing of said first axle relative to said frame, each of said pairs of spaced torque rods comprising upper and lower rods disposed substantially parallel as viewed in side elevation, one rod of each pair being substantially parallel to a corresponding rod of the other pair and the other rods of said pairs converging toward each other forwardly of said vehicle.

6. In a vehicle having a frame, a pair of rear axles arranged in tandem, a first of said axles being non-driven and the second of said axles being driven, and leaf-spring suspension means resiliently connecting said frame and axles and permitting variation in the spacing of said axles relative to said frame, apparatus comprising a pair of levers spaced laterally of said frame and disposed longitudinally of said frame, fulcrum supports carried by said frame for said levers for supporting said levers to permit the rocking of the levers in planes extending longitudinally of said frame, said levers being operatively connected to the said first axle to vary the spacing of said first axle relative to said frame upon the rocking of said levers on said fulcrum supports, said levers being also operatively connected to the said second axle to vary the spacing of said second axle relative to said frame upon the rocking of said levers, said levers being arranged to move said axles in opposite directions relative to said frame, and a pair of independently operable rocking means for rocking said levers, respectively, each of said rocking means including a shaft disposed adjacent a respective one of said fulcrum supports and free to rotate independently of the respective said fulcrum supports and independently of the other shaft, each of said rocking means also including a hydraulic ram assembly, each said ram assembly interconnecting said frame and one of said shafts for rotating the respective shaft independently of the other of said shafts, conduit means providing communication between a source of hydraulic pressure and the said ram assemblies to provide for supplying hydraulic pressure equally to said ram assemblies, and abutting means carried by said shaft means and levers for rocking said levers in one direction upon rotation of said shaft means in one direction, the rocking of said levers in said one direction raising said first axle and lowering said second axle relative to said frame whereby the load on said one axle is shifted to said second axle.

7. In a vehicle having a frame, a pair of axles arranged in tandem, and leaf-spring structures providing resilient connection between said frame and axles and arranged to permit each of said axles to be variously spaced toward and away from said frame, apparatus for shifting load carried by said frame from one to the other of said axles, comprising in combination, a pair of levers having one end of the respective levers operatively connected to a first of said axles and the other end of the respective levers operatively connected to the said leaf-spring structures, a pair of tubular pivot members each carried by said frame and providing a fulcrum support for a said lever, a pair of spaced and axially aligned shaft members each journaled in a said tubular pivot member and rotatable independently of the other shaft member relative to said tubular pivot member, and a pair of hydraulic ram assemblies each operatively connected to a respective shaft member to rotate the same in a first direction, conduit means arranged to supply hydraulic pressure simultaneously to both said ram assemblies and to equalize the hydraulic pressure supplied to said ram assemblies, said shaft members and levers, respectively, having associated abutting portions positioned to rock said levers, upon rotation of the shaft members in said first direction, in a direction to raise said first axle relative to said frame and to depress the said leaf-spring structure relative to said frame whereby load is shifted to said second axle.

8. In a vehicle having a frame, a pair of axles, arranged in tandem, and leaf-spring structures providing reslient connection between said frame and axles and arranged to permit each of said axles to be variously spaced toward and away from said frame, apparatus for shifting load carried by said frame from one to the other of said axles, comprising in combination, a pair of levers having one end of the respective levers operatively connected to a first of said axles and the other end of the respective levers operatively connected to the said leaf-spring structures, a pair of tubular pivot members each carried by said frame and providing a fulcrum support for a said lever, a pair of spaced and axially aligned shaft members each journaled in a said tubular pivot member and rotatable independently of the other shaft member relative to said tubular pivot member, a pair of hydraulic ram assemblies each operatively connected to a respective shaft member to rotate the same in a first direction, conduit means arranged to supply hydraulic pressure simultaneously from a common source of hydraulic pressure in equal degrees of pressure to said ram assemblies, said shaft members and levers, respectively, having associated abutting portions positioned to rock said levers, upon rotation of the shaft members in said first direction, in a direction to raise said first axle relative to said frame and to depress the said leaf-spring structure relative to said frame whereby load is shifted to said second axle, and torque rods arranged in parallelograms pivotally connected to said frame and said first axle to maintain its position in a plane substantially normal to said frame upon being raised.

9. In a vehicle having a pair of rear axles arranged in tandem along and below the vehicle frame and suspended by spring structures permitting varying the spacing between the said axles and said frame, the first of said axles being non-driven and the second of said axles being driven, the first of said axles being positioned forwardly of the second of said axles and being divided into portions disposed on opposite lateral sides of the vehicle to accommodate a driving shaft extending to said second axle, a pair of levers each operatively engageable by one of said portions of said first axle, a pair of hollow pivot members each carried by said frame adjacent the lateral sides thereof and providing fulcrum support for a said lever, a pair of rocker shafts each extending through a said hollow pivot member to rotate independently thereof and independently of the other rocker shaft, a pair of hydraulic ram assemblies each connected to said frame and one of said rocker shafts to rotate abutting members extending radially from said rocker shafts, respectively, conduit means providing intercommunication between said ram assemblies and with a source of hydraulic pressure to supply hydraulic pressure in equal degrees of pressure to said ram assemblies, said levers having stop portions engageable by said abutting members, respectively, upon rotation in one direction of the rocker shafts by the hydraulic ram assemblies to rock said levers in a first direction, and connecting means interconnecting said levers and the spring structures suspending said second axle to urge said second axle downwardly from said frame upon rocking of said levers in said first direction, the rocking of said levers in said first direction operatively engaging and raising the said portions of said first axle toward said frame whereby the spacing of said axles relative to said frame is varied.

10. In a vehicle having a pair of rear axles arranged in tandem along and below the vehicle frame and suspended by spring structures permitting varying the spacing between the said axles and said frame, the first of said axles being non-driven and the second of said axles being driven, the first of said axles being positioned forwardly of the second of said axles and being divided into portions disposed on opposite lateral sides of the vehicle to accommodate a driving shaft extending to said second axle, a pair of levers each operatively engageable by one of said portions of said first axle, a pair of hollow pivot members each carried by said frame adjacent the lateral sides thereof and providing fulcrum support for a said lever, a pair of rocker shafts each extending through a said hollow pivot member to rotate independently thereof and independently of the other rocker shaft, a pair of hydraulic ram assemblies each connected to said frame and one of said rocker shafts to rotate abutting members extending radially from said rocker shafts, respectively, conduit means providing intercommunication between said ram assemblies and with a source of hydraulic pressure to supply hydraulic pressure to said ram assemblies and to maintain equality in degree of the supplied hydraulic pressure, said levers having stop portions engageable by said abutting members, respectively, upon rotation in one direction of the rocker shafts by the hydraulic ram assemblies to rock said levers in a first direction, connecting means interconnecting said levers and the spring structures suspending said second axle to urge said second axle downwardly from said frame upon rocking of said levers in said first direction, the rocking of said levers in said first direction operatively engaging and raising the said portions of said first axle toward said frame whereby the spacing of said axles relative to said frame is varied, and torque rods arranged in parallelograms for maintaining the position of said portions of the first axle in a vertical plane, said torque rods having their rearward ends pivotally carried by said frame and their forward ends pivotally carried by said portions of said first axle.

References Cited in the file of this patent

UNITED STATES PATENTS

| | | |
|---|---|---|
| 1,673,467 | Maurer | June 12, 1928 |
| 1,741,425 | Masury | Dec. 31, 1929 |
| 1,822,159 | Masury | Sept. 8, 1931 |
| 2,554,785 | Leliter | May 29, 1951 |
| 2,659,446 | Willock | Nov. 17, 1953 |